Jan. 23, 1968

W. D. CLINTON 3,364,743

TURBINE FLOWMETER

Filed Sept. 28, 1965

INVENTOR.
WILLIAM D. CLINTON
BY Lester W. Clark
ATTORNEY

Jan. 23, 1968  W. D. CLINTON  3,364,743
TURBINE FLOWMETER
Filed Sept. 28, 1965  2 Sheets-Sheet 2
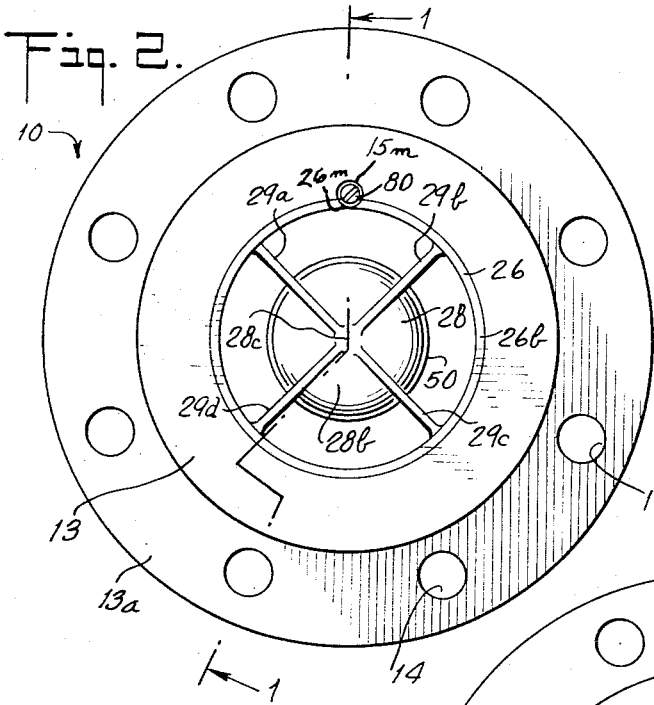
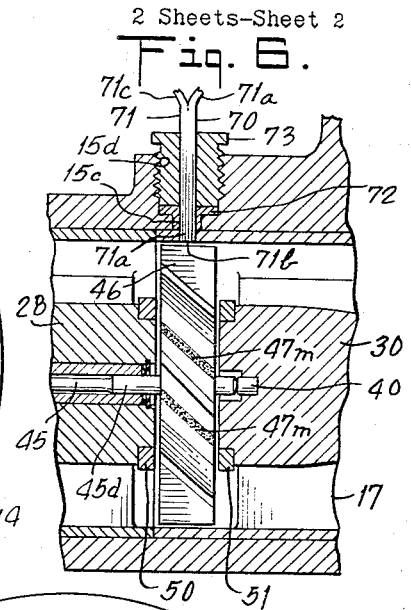
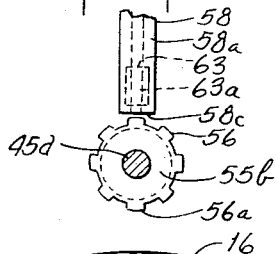
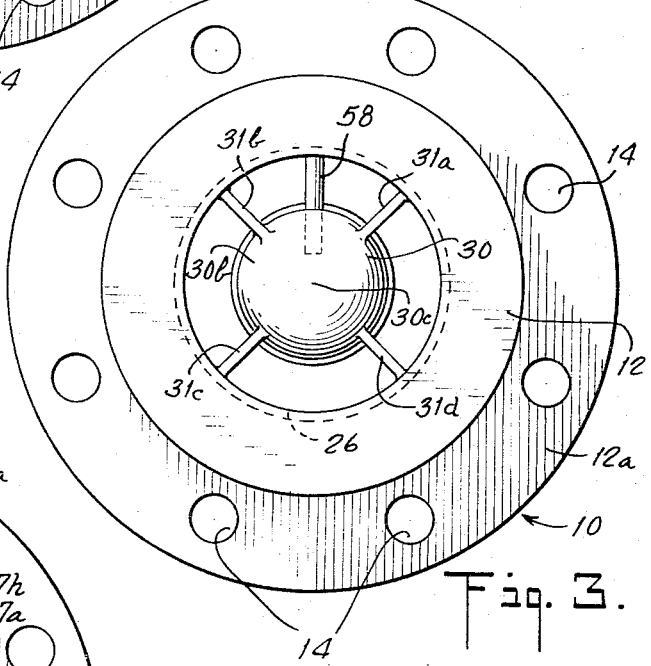
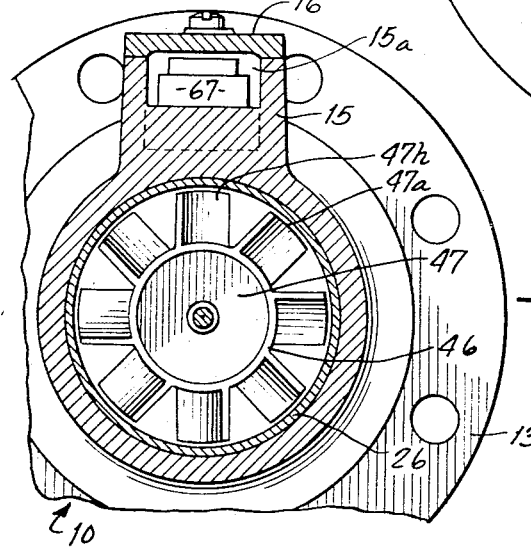
INVENTOR.
WILLIAM D. CLINTON
BY Lester W. Clark
ATTORNEY United States Patent Office 3,364,743
Patented Jan. 23, 1968

3,364,743
TURBINE FLOWMETER
William D. Clinton, Guilford, Conn., assignor to Neptune Meter Company, New York, N.Y., a corporation of New Jersey
Filed Sept. 28, 1965, Ser. No. 490,962
6 Claims. (Cl. 73—231)

ABSTRACT OF THE DISCLOSURE

A flowmeter, having a casing defining an internal passage, a downstream stator having an upstream end face, an upstream stator having a downstream end face spaced from the downstream stator upstream end face, and including a cylindrical bore therein, a rotor carried between the upstream and downstream end faces for axial rotation, and having a central hub, and a shaft carried for axial rotation within the upstream stator cylindrical bore, connected to the rotor to support and rotate therewith, and including a first portion rotatably fitted within the bore adjacent the rotor to act as a bearing for the shaft and a second portion having a smaller diameter than the first portion so as to define an annular space with the cylindrical bore, so that fluid from the passage is continuously circulated into and out of the annular space by bearing pumping action at the first shaft portion, the shaft having a diameter smaller at the second portion than at the outer diameter of the rotor.

Background of the invention

Turbine flowmeters are known, and typically include an axially mounted, bladed rotor installed in the fluid conduit so that the fluid to be measured causes the rotor to revolve. The rate of rotation of the rotor may be correlated directly to the rate of flow of the fluid, and the total angle of rotation of the rotor may be correlated directly to the total flow of fluid.

Prior art turbine flowmeters have encountered correlation and other problems associated with the fluids characteristics. Thus the vatriation of thrust on the bearings due to variations of fluid impact with velocity and specific gravity has caused variations in drag on the turbine rotation and has necessitated conservative bearing design. Moreover, fluid viscosity has also introduced variations in drag on the turbine depending upon turbine speed. Another class of prior art problems relates to the sensing means employed to derive information from the rotating turbine. There too the introduction of drag on the turbine has been a problem. In addition to presenting other disadvantages, each of these prior art problems results in unwanted or varying drag on the turbine that interferes with accurate measurement by rendering the device non-linear.

In fluid measuring devices of the turbine type known to the prior art, compensating means for attenuating the aforesaid introduction of differential drag on the turbine by impact and viscosity have been ineffective and cumbersome. What has been needed is a simplified fluid measuring device of the turbine type wherein such compensating expedients are structurally simple, effective, and constructed with few if any moving parts. In addition, such a fluid measuring device should employ a sensing means for measuring the rotational velocity of the turbine without the introduction of significant drag thereupon and with simplicity of construction and high reliability of operation. Finally, such a fluid measuring device should be susceptible to easy and rapid assembly and disassembly for purposes of inspection and/or repair and the like.

It is an object of the invention to provide an improved flow measuring device.

Another object of the invention is to provide a more accurate fluid measuring device.

Another object of the invention is to provide such a flow measuring device wherein axial thrust imparted by the fluid under measurement is automatically compensated.

Another object of the invention is to provide means for such thrust compensation which operate exclusively on fluid dynamics principles so as to be simple, rugged and dependable.

Another object of the invention is to provide such a flow measuring device having fluid viscosity compensating means of a simple, rugged and dependable nature so as to compensate for variations in retarding drag introduced by the viscosity of the fluid under measurement.

Another object of the invention is to provide such a flow measuring device having improved sensing means for deriving information from the rotation of the turbine shaft.

Another object of the invention is to provide such a flow measuring device that may be simply and efficiently assembled and disassembled.

These and other objects of the invention will become more clear as the detailed description of presently preferred but merely illustrative embodiments thereof is set forth hereinbelow in connection with the drawings, in which:

FIG. 2 is reduced left-hand end view of the apparatus shown in FIG. 1 showing the section planes 1—1 along which the view of FIG. 1 is taken;

FIG. 3 is a reduced right-hand end view of the apparatus shown in FIG. 1;

FIG. 4 is a reduced transverse section view of the apparatus shown in FIG. 1 viewed along plane 4—4 therein;

FIG. 5 is a fragmentary detail view of the first embodiment of sensing means employed in the apparatus shown in FIGS. 1–4; and FIG. 6 is a fragmentary detail view of a second embodiment of a flow measuring device according to the invention showing a second embodiment of sensing means.

Figure 1:
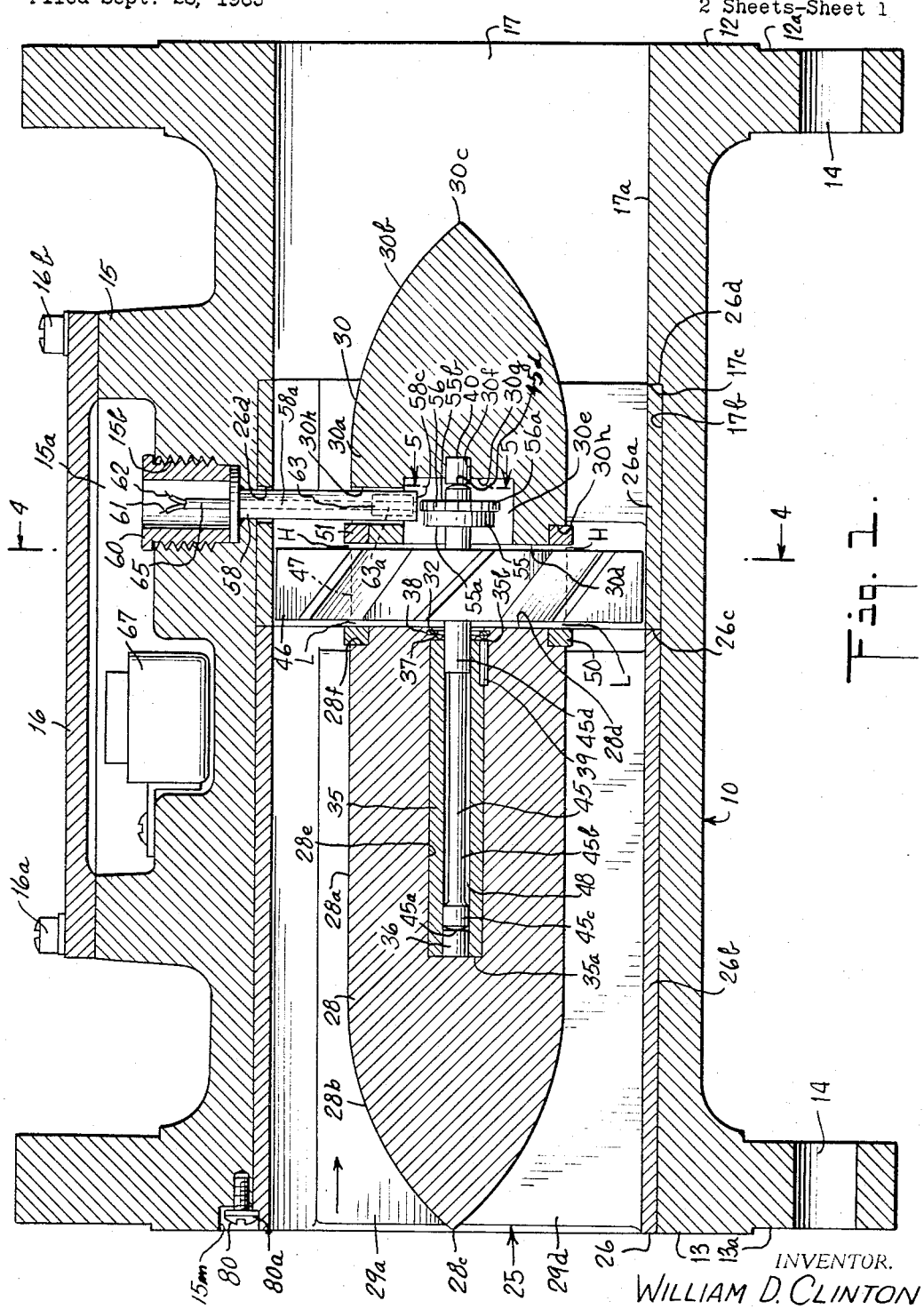
FIG. 1 is a longitudinal section view of a first embodiment of a flow measuring device according to the invention showing a first embodiment of sensing means.

Referring now to the figures, a first embodiment of a flow measuring device according to the invention is indicated generally at 10 in FIGS. 1–4. The flow measuring device 10 includes an outer cylindrical casing 11 having a pair of flared flanges 12 and 13 at opposite ends thereof. As may be best seen in FIGS. 2 and 3, each of flared flanges 12 and 13 includes a plurality of spaced peripheral bolt holes 14 for the purpose of securing the flow measuring device 10 to fluid conduit at either end thereof. Each of flared flanges 12 and 13 includes a peripheral stepped portion 12a, 13a, in the immediate annular vicinity of the bolt holes 14 for the accommodation of sealing gaskets (not shown) as will be readily apparent to those skilled in the art. As is best seen in FIGS. 1 and 4, intermediate flared flanges 12 and 13, casing 11 is formed to include an outwardly extending portion 15. The casing 11 may be fabricated as a unit integrally including the flared flanges 12 and 13 and the portion 15, as for example by casting the casing 11 in metal and machining the appropriate surfaces to form seats and the like. Portion 15 is formed to include an outwardly open central cavity 15a, which is closed by a cover plate 16 secured to housing 15 by a pair of machine screws 16a, 16b.

Cylindrical casing 11 further includes a stepped internal bore 17, which is preferably perpendicular to the end faces of flared flanges 12 and 13. Stepped internal bore 17 includes a first portion 17a extending inwardly from flared flange 12 toward flared flange 13, and a larger diameter portion 17b extending from flared flange 13 toward flared flange 12. The bore portions 17a and 17b meet to form an annular step 17c which is located closer to flared flange 12 than to flared flange 13.

A stator assembly indicated generally at 25 is carried within internal bore 17. Stator assembly 25 includes a compound tubular shell 26 having an outside diameter adapted to form a sliding fit within portion 17b of internal bore 17. Compound tubular shell 26 includes a short portion 26a and a longer portion 26b which are separate but contiguous portions which abut at 26c. Tubular portion 26a includes an end 26d forming the inner extreme of tubular shell 26 which is abutted against annular step 17c of cylindrical casing 11. The inner diameter of each of tubular portions 26a and 26b are equal to the diameter of portion 17a of inner bore 17 so that a single continuous inner surface is presented within internal bore 17 when tubular shell 26 is carried therein in abutment with annular step 17c.

Coaxially carried within tubular shell portion 26b is an upstream stator 28 having a generally cylindrical portion 28a and a curve-tapered portion 28b terminating in a pointed end 28c which is essentially coplanar with flared flange 13. Upstream stator 28 is positioned coaxially relative to tubular shell portion 26b by four radial braces (FIG. 2) 29a–29d which extend from essentially the entire length of stator 28a to tubular shell portion 26b. The tapered portion 28a is hydrodynamically shaped to divide liquid entering internal bore 17 at flared flange 13 with a minimum degree of turbulence. The radial braces 29a–29d similarly are proportioned and arranged to be relatively inert hydrodynamically and to encourage straight-line flow in the direction of the arrow indicated in FIG. 1.

Similarly, tubular shell portion 26a has a downstream stator 30 mounted coaxially therein by (FIG. 3) four radial braces 31a–31d. The four braces of downstream stator 30 are aligned with the four braces of upstream stator 28, and the two stators are coaxial. Downstream stator 30 includes a cylindrical portion 30a curve-tapered at 30b in like manner to the taper already described with reference to stator 28, and terminating in a pointed end 30c.

Upstream stator 28 includes an inner end face 28d, and downstream stator 30 includes a corresponding and opposed inner end face 30d. The end face 28d is coplanar with the adjacent end of tubular shell portion 26b, and the end face 30d is spaced away from the adjacent end of tubular shell portion 26a. When tubular shell portions 26a, 26b are positioned in abutment as is illustrated in FIG. 1, the end faces 28d, 30d accordingly are arranged in spaced relationship. Upstream stator 28 includes a coaxial bore 28e extending from end face 28d. Carried within bore 28e is a tubular bearing insert 35 having a first end 35a which rests against the innermost end of bore 28e and a second end 35b which is recessed slightly from stator end face 28d. At the innermost end of bore 28e, and coaxial therewith, is a cylindrical thrust bearing 36, secured in place by being force-fitted into end 35a of tubular bearing insert 35. A wave spring 37 and a retaining spring 38 retain bearing insert 35 axially within bore 28e. Wave spring 37 rests against bearing insert end 35b, and is retained by spring 38 which is clipped into an annular groove 32 in bore 28e. A key-pin 39 occupies a position at the interface of insert end 35b with bore 28e so as to prevent rotation of insert 35 in bore 28e.

Downstream stator 30 includes a cylindrical chamber 30e coaxial with bore 28e in upstream stator 28 and having an opening at end face 30d. A cylindrical thrust bearing 40 is recessed into downstream stator 30 in a cylindrical opening 30f in the inner end face 30g of cylindrical chamber 30e. Cylindrical thrust bearing 40 is coaxial with cylindrical thrust bearing 36. A radial opening 30h is provided into chamber 30e, for a purpose to be hereinafter described.

A rotor shaft 45 is supported for rotation by tubular bearing insert 35 and extends from cylindrical thrust bearing 36 to cylindrical thrust bearing 40. Carried on rotor shaft 45, for rotation therewith, is a bladed rotor 46 including a central hub 47 (FIG. 4) and a plurality of peripheral blades 47a–47h. While eight blades are shown in the illustrated embodiments, the number of blades may be varied in accordance with hydrodynamic considerations. The rotor 46 is fixedly located axially on shaft 45 in the space between opposed stator end faces 28d and 30d, so that rotor 46 may freely rotate with shaft 45 relative to stators 28, 30. The remote end faces 45a, 45d of rotor shaft 45 are each formed as a semispherical surface. The shaft end faces 45a, 45d are opposed respectively by thrust bearings 36, 40 but, as will be pointed out hereinafter, because of total thrust compensation, there is no thrust from faces 45a, 45d to bearings 36, 40. The shaft 45 normally floats axially under balanced forces. A shaft portion 45b located within tubular bearing insert 35 is of reduced diameter, and is terminated short of end 45a so as to define a short cylindrical portion 45c at end face 45a having a diameter sufficient to be closely and rotatably held within tubular bearing insert 35. Reduced diameter portion 45b is also terminated short of the remote end of tubular bearing insert 35 so as to define a portion 45d, also having the full shaft diameter sufficient to be closely and rotatably held within tubular bearing insert 35. Thus shaft 45 is rotatably supported within tubular bearing insert 35 at shaft portions 45c and 45d, and an annular space 48 is bounded by intermediate reduced diameter shaft portion 45b and tubular bearing insert 35.

The rotation of shaft 45 causes bearing pumping at the interface of shaft portion 45d and bearing insert 35. During operation of the flow measuring device, the fluid in bore 17 is continuously circulated into and out of annular space 48 by the aforesaid bearing pumping action. It has now been found that provision of annular space 48 renders the device viscosity-compensating.

The curve of rotor 46 rotational response versus actual fluid flow is normally distorted by the viscosity of the fluid so that the curve at the higher shaft 45 speeds is depressed, thus giving the appearance of a high spot at the lower shaft 45 speeds. This differential effect of viscosity occurs because the retarding drag is proportional to the velocity of the moving member (e.g., the rotor 46) therethrough.

The provision of annular space 48 flattens the curve by introducing additional drag selectively at the lower shaft 45 speeds. The flow measuring device is thus rendered relatively linear with regard to viscosity effects. This occurs because the diameter of shaft 45 is small compared to the diameter of rotor 46. The torque introduced at shaft 45 by the viscosity of the fluid in annular space 48 is thus significant only at the lower shaft 45 speeds. The device is thereby more linear than heretofore possible, thus more accurate over a working range of flow-rates.

The above description of compensation for viscosity presupposed a constant viscosity, the compensation being upon the effect of viscosity at different shaft 45 speeds. However, the device also compensates for non-linearity in the same characteristic when the viscosity of the fluid changes. Since the fluid is continually circulated into and out of annular space 48, the viscosity is always equal inside and outside. Thus the same compensation occurs after the viscosity changes. This extra flexibility is available over a reasonable range of viscosities, as wide as are typically applied to a single meter.

Upstream stator 28 includes an annular recess 28f at the outer periphery of end face 28d, and downstream stator 30 includes a corresponding annular recess 30j at the outer periphery of end face 30d. An annular ring 50 is carried within annular recess 28f, and a similar annular ring 51 is carried within annular recess 30j. Rings 50, 51 may be secured to stators 28, 30 by means of being force-fitted thereon, or by other expedients. Each of rings 50, 51 has a larger outer diameter than the adjacent portions of stators 28, 30, and has a thickness equal to the width of its respective annular recess 28f, 30h, so as to constitute a flange at each of faces 28d, 30d. Such a flange can also be formed integrally with stators 28, 30.

Fluid approaching the upstream ring 50 in the direction of the arrow shown in FIG. 1 is deflected upwardly so as to produce, by fluid impact phenomena, a high pressure zone on the upstream side of ring 50, and to produce, by Bernoulli effect, a low pressure zone at the radial periphery of ring 50. The fluid streamlets that are deflected outwardly return to their normal path after they have passed ring 50. That is to say, they return to the same relationship (i.e. axial) to rotor hub 47 as they had previously to portion 28a of upstream stator 28. However this return is not instantaneous and for a small portion of the axial length of hub 47 the fluid streamlets are still returning from their outwardly deflected position. The effect of this delayed return of the streamlets to flow parallel to hub 47 is to create an extension of the aforesaid low pressure area to the downstream side of ring 50 in the general vicinity of the annulus labelled L in FIG. 1. It will be understood that this low pressure area is merely centered on the annulus indicated at L, and that its effect, although diminished proportionately, exists at distances inwardly and outwardly radially of that annulus.

When these same fluid streamlets approach ring 51 on stator 30 they are deflected outwardly over ring 51 and they return to the outline of portion 30a of stator 30 in the same manner as described previously with regard to ring 50. In this case, while a low pressure area is created downstream of the ring it is the upstream high pressure area which is utilized by the invention and which is indicated at annulus H in FIG. 1. The high pressure at annulus H extends a short distance upstream therefrom along hub 47 and extends inwardly and outwardly of the indicated annulus H.

The effect of creating a low pressure area in the vicinity of annulus L at the upstream face of rotor 46 is to allow the normal pressure of fluid on the downstream portions of rotor 46 to exert a force on rotor 46 and accordingly on shaft 45 in the upstream direction. It will be appreciated that this force is in the proper direction to be a compensatory mechanism for the thrust normally present in axial turbines due to the constant impact of fluid on the blades thereof. It will further be appreciated that the compensatory mechanism is self-adjusting, in that as axial thrust is increased by increased velocity of the fluid in bore 17 or by increased specific gravity thereof, the Bernoulli effect at ring 50 will also increase thereby causing a greater drop in pressure at annulus L and a greater compensating thrust in the upstream direction. While the normal pressure on the downstream side of rotor 46 does cooperate with the low pressure at annulus L to cause this compensatory thrust, the presence of downstream ring 51 increases to total effect by creating a downstream high pressure area in the vicinity of annulus H, having a pressure even higher than normal, so as to add another component of force in the upstream direction to render the total compensatory mechanism even more efficient. With the thrust compensating design according to the present invention, the usual variation in thrust with velocity is compensated for. Indeed, as has already been mentioned, the thrust compensation is total, so that no net thrust appears at bearings 36, 40, except during abrupt changes, as e.g. at start-up. Since there is no net thrust, there is no bearing drag, and the meter is rendered linear regarding that factor.

In the embodiment of the invention shown in FIGS. 1–4, incorporating the first embodiment of sensing means shown specifically in FIG. 5, a cylindrical magnetized body 55 is coaxially mounted on the portion of shaft 45 within cylindrical opening 30e of downstream stator 30 for rotation therewith. The body 55 is essentially a short bar magnet having a first pole at the end face 55a thereof and a second pole at the face 55b thereof. The north pole may be at either of ends 55a and 55b, with the south pole at the other end. A pole-piece 56, in the form of a toothed disc, is coaxially mounted above shaft 45 so that one face of pole-piece 56 is in flush contact with face 55b of the magnetized body 55. Pole-piece 56 includes a plurality of equispaced peripheral radial teeth 56a.

A probe 58 comprises an elongated cylindrical portion 58a which extends radially inward from a flanged end 58b through an aperture 26d in tubular portion 26a, and through radial opening 30h, into cavity 30e. End 58c of probe 58 is situated in the immediate proximity of the teeth 56a of pole-piece 56. A nipple 60 is threadedly engaged in an aperture 15b of casing portion 15, thereby securing probe 58 into position by clamping action on flange 58b thereof. Located within probe 58 adjacent end 58c thereof is a coil of wire 63 wound on a magnetically permeable core 63a, which core extends to the very end 58c of probe 58 to lie in close proximity to teeth 56. A pair of leads 61, 62 from coil 63 pass out of probe 58 and through nipple 60 in a jacket 65. The leads 61, 62 may be connected (not shown) to a pre-amplifier 67 for detection and utilization of the signal developed thereacross due to the action of moving teeth 56 on coil 63. Such utilization may include application of square waves derived from the aforesaid signal to digital or other information processing equipment so that read out of flow rate and total flow may be had. The pre-amplifier 67 and its characteristics do not form a part of the present invention and will not be described further.

Magnetic flux flows between the two faces 55a, 55b, of cylindrical magnet 55 by flowing in a magnetic circuit including an internal path through the body of the magnet itself and an external path through pole-piece 56 and the external space between pole face 55a and pole-piece 56. The existence of teeth 56a at pole-piece 56 warps the external path radially so that at each of teeth 56a the external magnetic flux path between the poles of magnet 55 is projected radially outward while between each pair of teeth 56a the external magnetic flux is held inwardly. As a result turning of shaft 45 creates periodic increases and decreases of magnetic flux at core 63a in accordance respectively with the presence or absence of a tooth 56a thereunder. This variation in flux causes a corresponding variation in signal induced in coil 63 and accordingly present at leads 61, 62.

It will be appreciated that the number of teeth 56a may be varied to produce a signal appropriate for the use of any particular flow measuring device and indicating means. The sensing means including the magnet 55, the pole-piece 56, and the probe 58 is more fully described in the copending application of Clinton and Somers, having Ser. No. 490,991, filed Sept. 28, 1965, and assigned to a common assignee with the present invention. As is pointed out therein, the frequency of pulses at leads 61, 62 produced by the turning of pole-piece 56 with shaft 45 is proportional to the flow rate of fluid in bore 17, and the total number of pulses over a given period of time is proportional to the total flow therethrough. The arrangement is such that no drag is imposed upon shaft 45, the coil 63 is vary sensitive to flux variations, and the arrangement is extremely rugged and dependable.

In FIG. 6 there is shown, in fragmentary view, a second embodiment of a flow measuring device according to the invention. The difference between the two embodiments resides in the exclusive employment of magnetic sensing means in the first embodiment, and the exclusive employment of optical sensing means in the second embodiment. The only changes in the general structure with reference to that shown in FIGS. 1–4 are those necessary to accommodate the optical means of the second sensing means embodiment (FIG. 6) instead of the magnetic means of the first sensing means embodiment. While the two sensing means embodiment are shown separately, they could both be employed on a single flow measuring device, if desired.

The magnetic probe 58 and the associated mounting means, such as threaded casing aperture 15b, apertures 26d, 58c, and nipple 60, are omitted in the embodiment of FIG. 6. Instead, a threaded casing aperture 15d having a smaller coaxial aperture 15c at the bottom thereof appears radially outward of rotor 46. A probe 70 comprises a bundle of continuous glass fibers 71 captured at an end 71a by a fitting 72, set into aperture 15c and held in place by the engagement of a threaded nipple 73 in threaded aperture 15d. The bundle of glass fibers 71a is thereby held securely so that the innermost end 71b is positioned flush with the intersection of aperture 15c and bore 17.

The fibers constituting the bundle 71a may at some point remote from end face 71b thereof be bifurcated into two bundles. In FIG. 6 bifurcation is illustrated as being physically accomplished close to the probe 70 itself. Bifurcation can also be effected remote from probe 70, and can be effected by selection of two portions of the total bundle rather than by actual physical bifurcation thereof. In either event, a smaller bundle 71c, including approximately one-half of the fibers 71a, is employed to transmit light into the probe 70 and the remaining bundle 71d, is employed to extricate light from the probe 70. Since the fibers 71a are arranged randomly within bundle 71 the light carried into probe 70 from the bundle portion 71c will be randomly distributed over the face 71b and the light extricated from probe 70 by bundle portion 71d will have been received randomly over the surface 71b. Fiber optics probes of this nature are manufactured by Mechanical Technology, Inc. of Latham, New York, and a model KD-35 sensor manufactured by that organization may be employed with probe 70 to supply light to bundle 71c and to detect pulses of light transmitted by bundle 71d, prior to converting such pulses into flow rate and quantity information.

The number of blades 47a–47h carried by rotor 46 is determined by hydrodynamic considerations. It has now been found that a fiber optics probe such as probe 70 can be employed to measure speed of rotation directly on rotor 46 without compromising either the hydrodynamic design of rotor 46 or the electronic design of the equipment responsive to the light received and transmitted by fiber bundle portion 71d. One or more contrast bands 47m are interposed between each adjacent pair of rotor blades such as 47a, 47b, etc. The aforesaid bands 47m may be formed by structural elements such as metallic strips or may be formed by non-structural elements such as etched areas or scribed or scored areas. The essential point is that areas between the various pairs of blades be altered optically to resemble blades 47a–47h from the standpoint or reflectivity, size, and positioning so that the number of pulses or reflected light per revolution received and transmitted by fiber bundle portion 71d is increased while retaining the desired number of rotor blades 47a–47h.

This innovation allows the frequency of pulses to be modified to give the optimum signal characteristics for information processing purposes, while at the same time freeing the design of the blades 47a–47h to follow only hydrodynamic considerations. Fiber optics sensing means are most efficient when placed in close proximity to the reflecting object. In fluid measuring devices of the turbine type, it is impractical to include means in the fluid stream reaching out to the periphery of bore 17 so that optimum optical sensing thereof can be attained. Such means would disturb the flow, and reduce meter accuracy. It is accordingly desirable to sense the blades optically, since they extend to the periphery of bore 17 themselves. However, this introduces the difficulty that the number of blades is usually too low for correct pulse frequency from an information standpoint. The present optical means provides optimum information when the fluid is clear, and yet provides good information even when the fluid is nearly opaque. At the same time, it introduces no structure whatsoever into the fluid stream to disturb meter accuracy. The optical probe 70 and the surfaces 47m thereby constitute a distinct advance over prior flowmeter optical systems, and are especially valuable in smaller meter sizes where physical intrusions into the fluid stream are highly undesirable.

As previously mentioned, both embodiments of the flow measuring device employ the general arrangement of FIGS. 1–4. In FIGS. 1 and 2 there is shown a screw 80 which is set into a recess 15m in flared flange 13 immediately adjacent bore 17. The placing of screw 80 and the width of its head 80a is such that when tubular shell portion 26b is in place in bore 17, screw head 80a will bear against an arcuate recess 26m (FIG. 2) in shell portion 26b, thereby retaining same. It is a feature of the invention that screw 80 positions shell portion 26b, and thereby the stator 28, both axially and angularly, against movement relative to casing 15. Yet the simple removal of screw 80 allows the removal of tubular shell 26b from bore 17, with all the parts affixed to each of stator 28 and shaft 45. When the magnetic sensing means 58 is employed, this allows cleaning of magnet 55 as well as servicing of the rotor 46 and the bearing insert 35. Only the downstream stator 30 is not removed by the simple act of removing screw 80. That part, with bearing 40, can be removed by additionally removing probe 58 or probe 70, as the case may be. The provision of a stepped bore 17, together with all the internal parts mounted on tubular shells 26b and 26a, and the placing of screw 80, provides a simplified construction having greatly increased eased of maintenance.

The flow measuring device shown in the figures presupposes flow from flange 13 toward flange 12. The principles of the invention, however, are equally applicable to two-way flowmeters. The only modification to produce a two-way flowmeter is to lengthen stator 30 until it resembles stator 28, thus achieving symmetry. The only purpose in shortening stator 30 in the illustrated embodiments is to conserve materials in a one-way flowmeter where end-to-end symmetry is not necessary.

While the invention has been described with reference to specific illustrative embodiments, it is not limited thereto. Rather, the invention may take many other forms within the scope of its principles.

What is claimed is:

1. A flowmeter, comprising:
   (a) a passage for conducting fluid flow;
   (b) an upstream stator located at a first axial position within said conduit and having a downstream end face;
   (c) a downstream stator located at a second axial position within said passage and having an upstream end face spaced from the downstream end face of said upstream stator;
   (d) a rotor carried between said upstream and downstream end faces for axial rotation therebetween, and having a central hub;
   (e) and a pair of fluid obstruction means, a first located at said downstream end face, and a second located at said upstream end face, each of said fluid obstruction means comprising an annular protuberance at the periphery of its respective stator end face, and each being generally perpendicular at the upstream portion thereof relative to the direction of fluid flow, and extending into the fluid stream further than the adjacent portion of its respective stator and further than the adjacent portion of said rotor hub.

2. A flowmeter, comprisings
   (a) a passage for conducting fluid flow;

(b) an upstream stator located at a first axial position within said conduit and having a downstream end face, said upstream stator including a cylindrical bore therein;
(c) a downstream stator located at a second axial position within said passage and having an upstream end face spaced from the downstream end face of said upstream stator;
(d) a rotor carried between said upstream and downstream end faces for axial rotation therebetween, and having a central hub;
(e) a shaft carried for axial rotation within said upstream stator cylindrical bore, connected to said rotor to support and rotate with same, and including a first portion rotatably fitted within said bore adjacent said rotor to act as a bearing for said shaft, and a second portion having a smaller diameter than said first portion so as to define an annular space with said cylindrical bore, so that fluid from said passage is continuously circulated into and out of said annular space by bearing pumping action at said first shaft portion, and said shaft having a diameter smaller at said second portion than the outer diameter of said rotor; and
(f) a pair of fluid obstruction means, a first located at said downstream end face, and a second located at said upstream end face, each of said fluid obstruction means presenting a peripheral outline of greater diameter than said central hub of said rotor.

3. A flowmeter, comprising:
(a) a passage for conducting fluid flow;
(b) means within said passage defining a cylindrical bore;
(c) a rotor disposed axially within said passage for rotation in response to fluid flow therein; and
(d) a shaft carried for axial rotation within said upstream stator cylindrical bore, connected to said rotor to support and rotate with same, and including a first portion rotatably fitted within said bore adjacent said rotor to act as a bearing for said shaft, and a second portion having a smaller diameter than said first portion so as to define an annular space with said cylindrical bore so that fluid from said passage is continuously circulated into and out of said annular space by bearing pumping action at said first shaft portion, and said shaft having a diameter smaller at said second portion than the outer diameter of said rotor.

4. A flowmeter, comprising:
(a) a passage for conducting fluid flow;
(b) means within said passage defining a cylindrical bore;
(c) a rotor disposed axially within said passage for rotation in response to fluid flow therein; and
(d) a shaft carried for axial rotation within said upstream stator cylindrical bore, connected to said rotor to support and rotate with same, and including a pair of first portions rotatably fitted within said bore, one of said first portions being located adjacent said rotor to act as a bearing for said shaft, and a second portion between said large portions having a smaller diameter than said first portions so as to define an annular space with said cylindrical bore so that fluid from said passage is continuously circulated into and out of said annular space by bearing pumping action at said one first shaft portions, and said shaft having a diameter smaller at said second portion than the other diameter of said rotor.

5. A flowmeter, comprising:
(a) a passage for conducting fluid flow;
(b) a rotor disposed axially within said passage for rotation in response to fluid flow therein, said rotor including a central hub and spaced radial blades connected thereto, said hub including light reflective bands on the surface thereof each having a size, shape, placement, and reflectivity generally resembling a radial view of one of said blades, said bands being regularly located about the periphery of said hub between said blades; and
(c) a fiber optics probe located radially outward of said rotor, having a first portion adapted to conduct light radially inward against said blades and bands, and a second portion receptive to light reflected radially from said blades and bands.

6. A flowmeter, comprising:
(a) a casing defining an internal passage including restrictive means at a location therein;
(b) a first tubular shell adapted to be slidably accommodated within said passage into abutment with said restrictive means;
(c) a second tubular shell adapted to be slidably accommodated within said passage into abutment with said first tubular shell;
(d) a downstream stator carried axially within said first tubular shell and having an upstream end face;
(e) an upstream stator carried axially within said second tubular shell and having a downstream end face, and a cylindrical bore therein, said downstream end face being spaced from the upstream end face of said downstream stator;
(f) a rotor carried between said upstream and downstream end faces for axial rotation therebetween, and having a central hub;
(g) a shaft carried for axial rotation within said upstream stator cylindrical bore, connected to said rotor to support and rotate with same, and including a first portion rotatably fitted within said bore adjacent said rotor to act as a bearing for said shaft, and second portion having a smaller diameter than said first portion so as to define an annular space with said cylindrical bore, so that fluid from said passage is continuously circulated into and out of said annular space by bearing pumping action at said first shaft portion, and said shaft having a diameter smaller at said second portion than the outer diameter of said rotor; and
(h) a pair of fluid obstruction means, a first located at said downstream end face, and a second located at said upstream end face, each of said fluid obstruction means presenting a peripheral outline of greater diameter than said central hub of said rotor.

References Cited
UNITED STATES PATENTS

| | | | |
|---|---|---|---|
| 2,709,366 | 5/1955 | Potter | 73—231 |
| 2,812,661 | 11/1957 | Cox | 73—231 |
| 3,068,742 | 12/1962 | Hicks et al. | 250—227 |
| 3,084,545 | 4/1963 | Waugh | 73—231 |
| 3,217,539 | 11/1965 | Owen et al. | 73—231 |
| 3,240,063 | 3/1966 | Brueckner | 73—231 |
| 3,248,943 | 4/1966 | Francisco | 73—231 |
| 3,248,945 | 5/1966 | Karlby et al. | 73—231 |

RICHARD C. QUEISSER, *Primary Examiner.*
JAMES J. GILL, *Examiner.*
E. D. GILHOOLY, *Assistant Examiner.*

UNITED STATES PATENT OFFICE
CERTIFICATE OF CORRECTION

Patent No. 3,364,743　　　　　　　　　　　　　　January 23, 1968

William D. Clinton

It is hereby certified that error appears in the above numbered patent requiring correction and that the said Letters Patent should read as corrected below.

Column 1, line 43, for "vatriation" read -- variation -- column 2, line 32, before "reduced" insert -- a --; column 5, line 57, for "to" read -- the --; column 6, line 63, for "vary" read -- very --; column 7, line 2, for "embodiment" read -- embodiments --; line 56, for "or" read -- of --; line 57, for "or" read -- of --; column 8, line 35, for "eased" read -- ease --; line 74, for "comprisings" read -- comprising: --; column 9, line 61, for "large portions" read -- first portions --; line 68, for "other" read -- outer --.

Signed and sealed this 22nd day of April 1969.

(SEAL)
Attest:

EDWARD M. FLETCHER, JR.　　　　　　　　　EDWARD J. BRENNER
Attesting Officer　　　　　　　　　　　　Commissioner of Patents